United States Patent Office 3,413,466
Patented Nov. 26, 1968

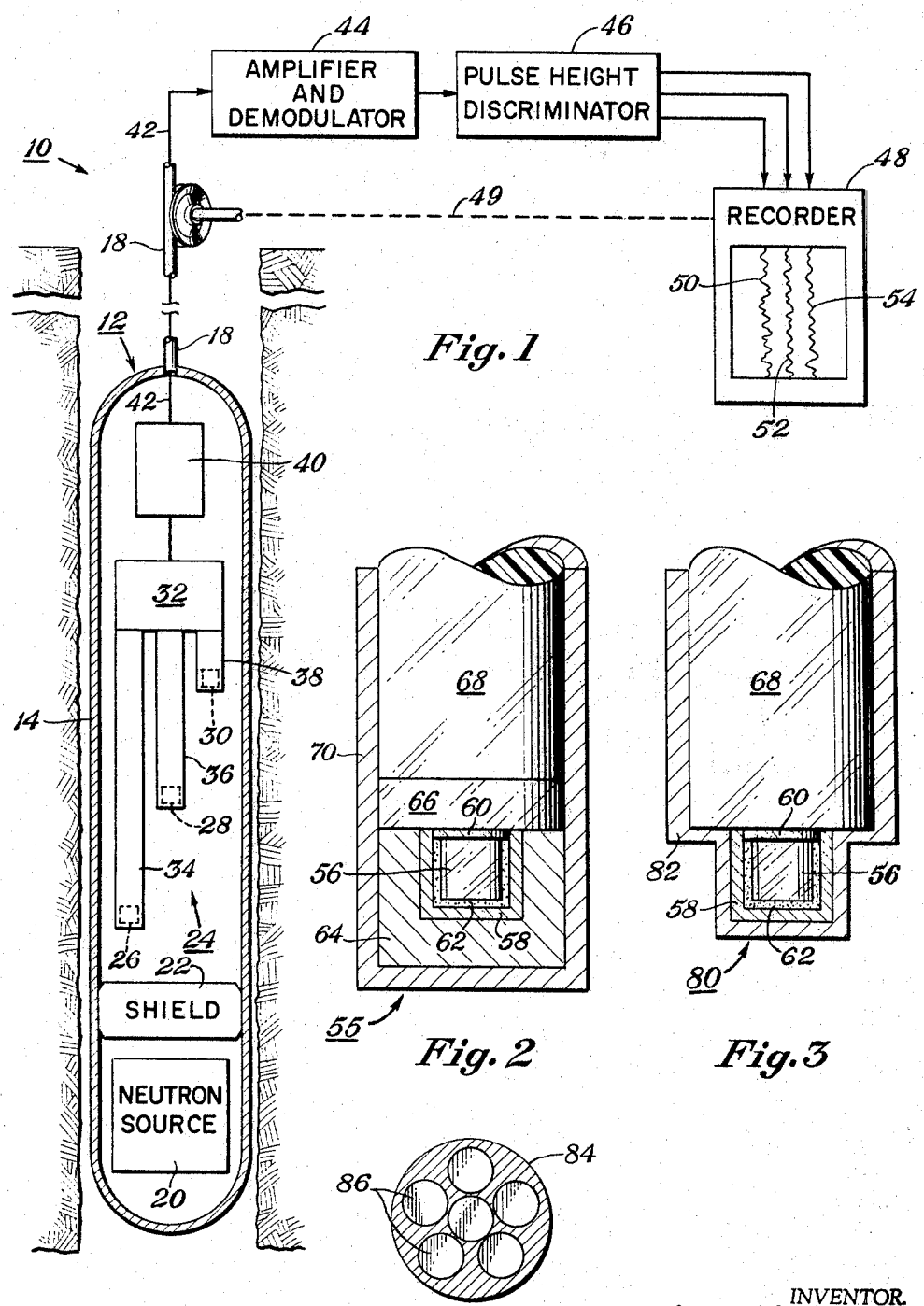

3,413,466
WELL LOGGING SYSTEM HAVING A PLURALITY OF LIGHT CONDUCTING RODS OF DIFFERENT LENGTHS
Linus S. Allen, Jr., Dallas, Tex., assignor to Mobil Oil Corporation, a corporation of New York
Filed Aug. 28, 1964, Ser. No. 392,875
14 Claims. (Cl. 250—71.5)

The present invention relates to radiation logging of boreholes and more particularly, but not by way of limitation, relates to an improved system for measuring a plurality of separate neutron counts and telemetering the several sets of data to the surface by means of a single transmitting channel.

It is well-known in the art to analyze earth formations in situ along the traverse of a borehole by means of various radioactive logging techniques. By such techniques, the presence of various elements and the porosity of the formation can be determined from which valuable deductions can be made as to whether or not economical quantities of petroleum or other mineral deposits are present at that particular depth. For example, it is frequently desirable to measure the count rate of either thermal or epithermal neutrons which return to the borehole from the formation as a result of irradiating the formation adjacent the well bore with neutrons. The neutrons are customarily counted by means of a scintillation crystal which emits a flash of light each time a neutron strikes the crystal. Each flash of light is converted to an electrical pulse by a photomultiplier tube located in the downhole logging tool. The pulses from the photomultiplier tube are amplified by a downhole amplifier and transmitted to the surface through a conductor sheathed in the suspension cable for the tool. At the surface a second amplifier receives the signals and drives a pulse height analyzer which discriminates between and passes only those pulses having a predetermined amplitude to eliminate noise pulses.

It is often desirable in this type of logging to measure either thermal or epithermal neutrons, or both, at several points spaced along the well bore. Using the systems heretofore available, separate telemetering systems, each having a detector crystal, photomultiplier tube, and two amplifiers, were required for each measurement. This materially increased the size and cost of the logging tool.

The present invention is concerned with a system for simultaneously determining a plurality of separate radiation counts and then transmitting the several counts to the surface using only a single telemetering channel comprised of a photomultiplier tube and preamplifier within the downhole tool, and the necessary amplifier and a pulse height discriminator at the surface. In general, the system is comprised of a plurality of neutron detector means, such as scintillation crystals, each of which is optically coupled to a single photomultiplier tube by an optical modulation means for modulating the light from each of the several detectors in a predetermined manner. The output of the photomultiplier tube is then transmitted uphole by a suitable amplifier to a receiver amplifier at the surface. The output of the receiver amplifier is fed to a pulse height discriminator at the surface which distinguishes between the modulated amplitudes of the pulses from the several detector crystals. In accordance with a more specific aspect of the invention, the optical modulation means comprises light pipes of different lengths so as to attenuate the optical outputs to the detector crystals by different factors. In accordance with another aspect of the invention, one or more of the scintillation crystals may be fully encased by a thermal neutron shield of cadmium metal having a cadmium sulfide transparent window therein for optically coupling the detector to the photomultiplier tube.

Therefore, an important object of the present invention is to provide a system for simultaneously making a plurality of radiation measurements and telemetering the measurements to the surface over a single channel.

Another object of the invention is to provide a system of the type described which is substantially less complex and expensive than previous systems and which may be made compact so as to be housed within a small diameter downhole tool.

A further object of the invention is to provide a system for detecting either thermal or epithermal neutrons.

Additional objects and advantages will be evident to those skilled in the art from the following detailed description and drawings; wherein:

FIGURE 1 is a schematic drawing of a system constructed in accordance with the present invention;

FIGURE 2 is a somewhat schematic longitudinal sectional view of a means for detecting epithermal neutrons which may be used in the system of FIGURE 1;

FIGURE 3 is a somewhat schematic longitudinal view of a means for detecting thermal neutrons which may be used in the system of FIGURE 1; and FIGURE 4 is a somewhat schematic drawing illustrating an alternative embodiment of the present invention.

Referring now to FIGURE 1, a logging system constructed in accordance with the present invention is indicated generally by the reference numeral 10. The logging system 10 comprises a downhole logging tool indicated generally by the reference numeral 12 having a suitable fluid-tight housing 14. The tool 12 is suspended by a cable 18 which is connected to a suitable arrangement for lowering and raising the tool through a well bore. A neutron source 20 is located at the lower end of the housing 14. Any conventional neutron source may be used and may be either a steady state source or a pulsed source. For example, a Ra-Be or a Po-Be capsule may provide a steady state source, or a d-t reaction such as described in U.S. Patent No. 2,905,826 may provide a pulsed source. A lead shield 22 separates the neutron source 20 from a neutron detecting system indicated generally by the reference numeral 24 which will presently be described in greater detail. In general, neutrons from the source 20 propagate into the formation surrounding the well bore. A portion of the neutrons return to the well bore as a result of scattering, and of that portion returning, a few are still in the epithermal range but most are thermalized.

The neutron detecting system 24 has three scintillation detector crystals 26, 28 and 30, shown in dotted outline. Each time a neutron strikes one of the detector crystals, a flash of light is emitted which is transmitted to a single photomultiplier tube 32 by separate optical coupling and modulation means 34, 36 and 38, respectively. The optical coupling and modulation means have different transmissivities and thereby modulate the intensity of the light flashes from the respective detector crystals to a different degree for purposes which will hereafter be described in greater detail. The photomultiplier tube 32 converts each flash of light into an electric pulse having an amplitude proportional to the modulated intensity of the flash of light reaching the photomultiplier tube. The output of the photomultiplier tube is transmitted to the surface by an amplifier 40 through a conductor 42 which forms a single electrical transmission channel and which is protected by the cable 18. The signal from downhole is applied to a receiver amplifier 40. The output from the amplifier and demodulator 44 is applied to a pulse height discriminator circuit 46 which has three windows for discriminating between the pulses from the respective detector crystals 26, 28 and 30, as will hereafter be described in greater detail. The count rates from the three windows are fed to a multiple trace recorder 48. The recorder 48 is operated in synchronism with movement of the tool 12 by a suitable mechanism 49 represented by the dotted shaft so that the three signals from the discriminator circuit are recorded as logging traces 50, 52 and 54 which indicate the count rate measured at a particular depth.

One or more of the three detectors 26, 28 and 30 may be constructed as represented by the assembly 55 in FIGURE 2. The assembly 55 is adapted to detect only epithermal neutrons as will presently be described. A scintillation crystal 56, such as europium activated lithium iodide, or other commercially available neutron detector crystal, is hermetically sealed in an aluminum cup 58 by a glass seal 60. The scintillation crystal 56 is potted in magnesium oxide 62 or other suitable reflector material for directing all light generated in the crystal out through the glass seal 60. The hermetically sealed crystal 56 is completely encased within a thermal neutron shield so that only epithermal neutrons will strike the crystal. The shield is comprised of a cadmium cup 64 and a transparent cadmium crystal 66, such as cadmium fluoride, both of which block thermal neutrons, yet pass epithermal neutrons. Thus the combination of the cadmium cup 64 and cadmium fluoride crystal 66 provides a complete thermal neutron shield about the crystal 56, yet the cadmium fluoride crystal provides a transparent window for optically coupling the scintillation crystal 56 to the photomultiplier tube 32. The shield could be entirely cadmium fluoride but would be more expensive. The scintillation crystal 56 is optically coupled to the photomultiplier tube 32 by a suitable light pipe 68, which may conveniently be a plastic rod. The entire optical system is encased in an opaque housing 70 which may conveniently be a machined aluminum tube that will also function as a means for retaining the various parts in operative position.

Any one or all of the detectors 26, 28 and 30 may be constructed like the system indicated generally by the reference numeral 80 in FIGURE 3. The system 80 is similar to the system 55 except that the thermal neutron shield, comprised of the cadmium metal cup 64 and cadmium fluoride crystal 66, is removed so that the system will count thermal neutrons rather than epithermal neutrons, and corresponding parts are therefore indicated by corresponding numbers for convenience of illustration. Thus the aluminum cup 58 in which the scintillation crystal 56 is sealed may be received directly in a well formed in an aluminum housing 82 which also houses the light pipe 68. The scintillation crystal 56 is sensitive to both thermal and epithermal neutrons, but the thermal neutron count will be greater than the epithermal neutron count by a factor of at least 100:1 and usually a factor of 1000:1 or greater so that the effect of the epithermal neutrons is insignificant and can be ignored. Thus it will be appreciated that the detector 55 excludes thermal neutrons from the scintillation crystal 56 so as to count only epithermal neutrons, while both thermal and epithermal neutrons have relatively free access to the scintillation crystal 56. As previously mentioned, the detectors 26, 28 and 30 may all be shielded from thermal neutrons so as to detect only epithermal neutrons, or all three detectors may detect both thermal and epithermal neutrons, or any combination of the two may be employed. In either event, the counts registered by the three detectors 26, 28 and 30 may be transmitted to the surface using the single channel shown in FIGURE 1.

In the embodiments illustrated in FIGURES 2 and 3, each of the optical coupling means 34, 36 and 38 is merely the light pipe 68. The light pipes are of different lengths so as to attenuate the intensity of the light transmitted by each to a different degree. Since the light pipe connecting the scintillation crystal 26 to the photomultiplier tube is longer than the light pipe for the crystal 28 which in turn is longer than the light pipe for the crystal 30, the intensity of light reaching the photomultiplier tube 32 from the crystal 30 will be greater than the light from the crystal 28 which will be greater than the light from the crystal 26. For example, assume that the optical coupling 38 has a transmissivity value of 1.0, the optical coupling 36 has a transmissivity value of 0.7, and the optical coupling system 34 has a transmissivity value of 0.5. Since the intensity of the light flashes caused by each neutron to which a particular crystal detector is sensitive are substantially equal, the light flashes reaching the photomultiplier tube 32 will have relative amplitudes of 1.0, 0.7 and 0.5 or some other predetermined relative intensities.

The photomultiplier tube 32 produces electrical pulses of corresponding amplitudes which are transmitted uphole to the surface amplifier 44 and applied to the pulse height discriminator 46. The pulse height discriminator has three separate windows which may be set to pass pulses having heights corresponding to dimensionless numbers 0.45 to 0.55, 0.65 to 0.75 and 0.95 to 1.05, respectively. Then the number of pulses passing through each window are recorded by the multitrace recorder 48 as the three separate traces 50, 52 and 54. In the event pulses from two separate scintillation crystals are received at the discriminator 46 simultaneously, the total height would be such as to fall outside any of the windows of the discriminator and therefore would be rejected.

Although the optical coupling means, 34, 36 and 38 are preferably light pipes of different lengths so as to provide a convenient modulation means and also space the crystal detectors at points along the well bore, it is to be understood that other suitable optical modulating means may be provided for modulating the outputs from the scintillation crystals. For example, the ends of the light pipes may be coated so as to vary the transmissivity of the optical coupling means. It will also be appreciated that more than three sets of data may be transmitted, the number being limited only by the sophistication of the optical modulation and coupling means and the pulse height discriminator equipment. The sensitivity of the system may be increased by increasing the number of scintillation crystals and associated optical coupling means for a given value of modulation. This can easily be accomplished by reason of the fact that photomultiplier tubes are available on the market which are sensitive to relatively large areas of light and can therefore monitor a relatively large number of light pipes or other optical coupling mechanisms. For example, a photomultiplier tube 84 having a diameter as illustrated in FIGURE 4 may simultaneously monitor the outputs from a pluraitly of detector crystals and light pipes 86.

From the above detailed description of several preferred embodiments of the invention, it will be appreciated that a system for simultaneously making a number of different radiation measurements has been described which requires only a single photomultiplier tube and single telemetering channel to transmit the separate sets of data to the surface. The single photomultiplier tube substantially improves accuracy because a drift in the tube, which frequently occurs due to the high down-hole temperatures, will result in equal changes in the three signals. Thus if a ratio measurement is being taken, as will often be the case, the ratio value is not affected by drifts in the tube. The system is particularly adapted for taking measurements at longitudinally-spaced points along a downhole tool and is capable of measuring either thermal or epithermal neutron counts, as well as any other radiation counts which are detected by photo pulses of approximately uniform amplitudes. The system may also be used in gamma ray detection work by using conventional and well-known subtracting networks in the surface equipment to subtract the overlapping low energies from one modulated channel from the energies of interest of the other modulated channels.

Although particular embodiments of the invention have been described in detail, it is to be understood that various changes, substitutions and alterations can be made therein without departing from the spirit and scope of the invention as defined by the appended claims.

What is claimed is:

1. A radiation detection and telemetering system comprising:
   a plurality of detector means each adapted to produce a pulse of light energy when struck by radiation,
   modulation means connected to each detector means for continuously attenuating the intensity of the pulses of light energy from the respective detector means by predetermined factors such that the pulses from the respective detector means will have a distinctively characteristic intensity,
   means for converting the modulated pulses of light energy from the plurality of detector means into electrical pulses on a single transmission channel having amplitudes corresponding to the intensities of the respective pulses of light energy,
   discriminator means for distinguishing between the electrical pulses of different amplitudes and separating the pulses into groups as originated by the respective detector means, and
   means for counting the number of pulses originated by each detector means.

2. A radiation detection and telemetering system as defined in claim 1 wherein:
   the modulation means are comprised of light pipes of different lengths.

3. A radiation detection and telemetering system as defined in claim 1 wherein:
   at least one of the detector means is a scintillation crystal sensitive to neutrons.

4. A radiation detection and telemetering system as defined in claim 1 wherein:
   at least one of the detection means is a scintillation crystal sensitive to neutrons and the crystal is encased by shield means for blocking thermal neutrons and passing epithermal neutrons whereby the detector will be sensitive only to epithermal neutrons.

5. A radiation detection and telemetering system as defined in claim 1 wherein:
   the shield means includes a transparent cadmium compound crystal optically coupling the crystal to the modulation means.

6. A radiation detection and telemetering system comprising:
   a plurality of scintillation crystals for producing a flash of light when struck by radiation,
   a photomultiplier tube of converting a flash of light into an electrical pulse having a height proportional to the intensity of the flash of light,
   a light pipe connecting each of the scintillation crystals to the photomultiplier tube, the light pipes having different transmissivity characteristics for attenuating the light flashes from each crystal to a different degree such that the pulses from the respective crystals will have a distinctively characteristic intensity,
   discriminator means for distinguishing between electrical pulses from the photomultiplier of different heights and separating the pulses into groups corresponding to the attenuated light flashes from the respective light pipes and for producing a signal indicative of the number of pulses in each group.

7. A radiation detection and telemetering system as defined in claim 6 wherein the light pipes are of different lengths in order to provide different transmissivity characteristics.

8. A radiation detection and telemetering system as defined in claim 6 wherein at least one of the scintillation crystals is enclosed in a shield for blocking thermal neutrons and passing epithermal neutrons, said shield having a transparent window optically coupling the crystal to the corresponding light pipe.

9. A radiation detection and telemetering system as defined in claim 8 wherein the shield is comprised of a cadmium metal cup having an open end and a transparent cadmium fluoride crystal over the open end of the cup.

10. A radiation logging system for boreholes comprising:
    a housing for passage through the well bore,
    means for moving the housing through the well bore,
    a source of neutrons in the housing for irradiating the formation around the well bore,
    a plurality of scintillation crystals in the housing for producing a flash of light when struck by a neutron,
    shield means in the housing for preventing direct irradiation of the crystals from the source of neutrons,
    a photomultiplier tube in the housing for converting a flash of light into an electrical pulse having an amplitude proportional to the intensity of the flash of light,
    a light pipe optically coupling each crystal to the photomultiplier tube, the light pipes having different lengths to produce different transmissivity characteristics for attenuating the light flashes from the respective crystals to different distinctively characteristic degrees,
    discriminator means without the housing and electrically connected to the photomultiplier tube by a single transmission channel for distinguishing between pulses of different heights from the photomultiplier and separating the pulses into groups corresponding to the attenuated light flashes from the respective light pipes and for producing a signal indicative of the number of pulses in each group, and
    recording means operated in synchronism with movement of the housing through a well bore for recording the signals with respect to the position of the housing within the well bore.

11. A detector for measuring the epithermal neutron count in a given location comprising:
    a scintillation crystal for producing a flash of light when struck by a neutron,
    a shield around the crystal for blocking thermal neutrons and passing epithermal neutrons comprised of cadmium metal, said shield having a cadmium fluoride crystal window for passing the flashes of light, and
    means for detecting the flashes of light passing through the window.

12. A radioactive well logging system comprising:
    a borehole unit adapted to be inserted into a borehole,
    means for moving the borehole unit through the borehole,
    a source of neutrons in said unit for irradiating the formation with neutrons,
    a plurality of scintillation detector means in the borehole unit located at different distances from said source for detecting the resulting secondary radiation,
    photomultiplier means located in said borehole unit,
    light pipe means optically coupling each scintillation detector means to said photomultiplier means,
    said light pipe means each having different lengths,
    discriminating means coupled to said photomultiplier means and responsive to pulses of different heights from said photomultiplier means for separating said pulses into groups corresponding to the radiation detected by said respective scintillation detector means, and recording means coupled to said discriminating means for separately recording the intensity of pulses sensed in each group.

13. The system of claim 12 wherein:
said discriminating means and said recording means are located at the surface, and
electrical transmission means extending from said borehole unit to the surface for transmitting the output of said photomultiplier means to said discriminating means, said scintillation detector means being sensitive primarily to neutrons.

14. The system of claim 13 wherein said electrical transmission means for transmitting the output of said photomultiplier means to said discriminating means comprises a single transmission channel.

References Cited
UNITED STATES PATENTS

| | | | |
|---|---|---|---|
| 2,755,390 | 7/1956 | Teichmann | 250—71.5 |
| 3,127,512 | 3/1964 | Monaghan | 250—71.5 |
| 3,188,478 | 6/1965 | Binks | 250—227 X |
| 3,247,377 | 4/1966 | Hall | 250—71.5 |
| 3,264,477 | 8/1966 | Hall | 250—71.5 |

RALPH G. NILSON, *Primary Examiner.*

S. ELBAUM, *Assistant Examiner.*